(12) United States Patent  
Nouri

(10) Patent No.: US 12,080,286 B2  
(45) Date of Patent: Sep. 3, 2024

(54) DETERMINATION OF TASK URGENCY BASED ON ACOUSTIC FEATURES OF AUDIO DATA

(71) Applicant: Microsoft Technology Licensing, LLC, Redmond, WA (US)

(72) Inventor: Elnaz Nouri, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 315 days.

(21) Appl. No.: 17/163,176

(22) Filed: Jan. 29, 2021

(65) Prior Publication Data

US 2022/0246146 A1 Aug. 4, 2022

(51) Int. Cl.
| | |
|---|---|
| *G10L 15/22* | (2006.01) |
| *G06N 3/08* | (2023.01) |
| *G10L 15/02* | (2006.01) |
| *G10L 15/06* | (2013.01) |
| *G10L 25/63* | (2013.01) |
| *G10L 25/90* | (2013.01) |

(52) U.S. Cl.
CPC .......... *G10L 15/22* (2013.01); *G06N 3/08* (2013.01); *G10L 15/02* (2013.01); *G10L 15/063* (2013.01); *G10L 25/63* (2013.01); *G10L 25/90* (2013.01); *G10L 2015/223* (2013.01)

(58) Field of Classification Search
CPC ....... G10L 15/22; G10L 15/02; G10L 15/063; G10L 25/63; G10L 25/90; G10L 2015/223; G10L 25/51; G06N 3/08

See application file for complete search history.

(56) References Cited

U.S. PATENT DOCUMENTS

| | | | |
|---|---|---|---|
| 7,013,005 B2 | 3/2006 | Yacoub et al. | |
| 7,940,914 B2 | 5/2011 | Petrushin | |
| 8,635,065 B2 | 1/2014 | Goronzy-thomae et al. | |
| 8,909,529 B2 | 12/2014 | Riccardi | |
| 9,117,447 B2 | 8/2015 | Gruber et al. | |
| 9,761,249 B2 | 9/2017 | Deleeuw | |
| 10,818,287 B2 | 10/2020 | White et al. | |
| 11,373,117 B1* | 6/2022 | Cui | G06F 16/285 |

(Continued)

OTHER PUBLICATIONS

Landesberger, et al., "Do the Urgent Things first!—Detecting Urgency in Spoken Utterances based on Acoustic Features", In Proceedings of the 28th ACM Conference on user Modeling, Adaptation and Personalization, Jul. 14, 2020, pp. 53-58.

(Continued)

*Primary Examiner* — Michael Colucci

(57) ABSTRACT

Systems and methods are provided for determining importance and urgency of a task based on acoustic features of audio input associated with the task. The determining includes classifying the task into one or more classes associated with importance, urgency, and priority of the task. The classification may use a trained machine learning model of acoustic features and embedding for a neural network. The task classifier uses feature acoustics of either or both the foreground and background audio. The feature acoustics include a pitch, a tone, and a volume over a time duration of the audio input. A combination of the acoustic features determines a class associated with the task. The machine learning model includes a regression model of acoustic features over time and a model with embedding for a neural network.

20 Claims, 9 Drawing Sheets

(56) References Cited

U.S. PATENT DOCUMENTS

| | | | | |
|---|---|---|---|---|
| 11,516,613 | B1* | 11/2022 | Chebiyyam | G06F 18/24 |
| 2010/0036667 | A1* | 2/2010 | Byford | G16H 40/67 |
| | | | | 704/E21.001 |
| 2015/0149177 | A1* | 5/2015 | Kalns | G10L 15/1822 |
| | | | | 704/257 |
| 2016/0210985 | A1* | 7/2016 | Deleeuw | G06F 40/40 |
| 2016/0239848 | A1* | 8/2016 | Chang | G06Q 30/016 |
| 2018/0325470 | A1* | 11/2018 | Fountaine | G08B 21/0446 |
| 2021/0020191 | A1* | 1/2021 | Venneti | G10L 21/0208 |
| 2021/0058515 | A1* | 2/2021 | Rings | H04M 3/5175 |
| 2021/0225365 | A1* | 7/2021 | Sinha | H04R 3/04 |
| 2021/0280169 | A1* | 9/2021 | Suzuki | G10L 15/063 |
| 2022/0182494 | A1* | 6/2022 | Kwatra | G16Y 40/30 |

OTHER PUBLICATIONS

"Invitation to Pay Additional Fees issued in PCT Application No. PCT/US22/012388", Mailed Date: May 17, 2022, 10 Pages.

Principi, et al., "An integrated system for voice command recognition and emergency detection based on audio signals", In Journal of Expert Systems with Applications, vol. 42, Issue 13, Aug. 1, 2015, pp. 5668-5683.

"International Search Report and Written Opinion Issued in PCT Application No. PCT/US22/012388", Mailed Date: Jul. 8, 2022, 16 Pages.

Cai, et al., "Audio-Textual Emotion Recognition Based on Improved Neural Networks", In Journal of Mathematical Problems in Engineering, vol. 2019, Dec. 31, 2019, pp. 1-10.

Chuang, et al., "Emotion recognition using acoustic features and textual content", In Proceedings of IEEE International Conference on Multimedia and Expo, Jun. 27, 2004, pp. 53-56.

McFee, Brian, et al., "librosa: Audio and Music Signal Analysis in Python," Proc. of the 14th Phython in Science Conf. (SCIPY 2015), pp. 18-24.

Hu, Hu, et al., "Device-Robust Acoustic Scene Classification Based on Two-Stage Categorization and Data Augmentation," Technical Report, Detection and Classification of Acoustic Scenes and Events, 2020.

\* cited by examiner

Task Classifications 410
Importance 412: IMPORTANT / NOT IMPORTANT
Urgency 414: URGENT / NOT URGENT Task Ranking 420
Urgency Score 422: 1-5 (5: the most urgent)
Importance Score 424: 1-5 (5: the most important)

Classification Rule 430:
Conditions:
 - Foreground Pitch: greater than 7
 - Foreground Volume: greater than 9
 - Background Audio Type: Siren Class: URGENT and IMPORTANT

FIG. 4

DETERMINATION OF TASK URGENCY BASED ON ACOUSTIC FEATURES OF AUDIO DATA

BACKGROUND

Various calendar and task management applications have widely available to conveniently create and manage tasks and applications. Some applications reside mobile applications (e.g., smartphones and pads) while other applications operate in smart devices (e.g., smart speakers). The application interactively receives commands from users for creating tasks (e.g., scheduling a calendar event, making a phone call, etc.). As user appreciate the applications managing tasks, developing a technology that better meets user requirements on managing tasks at various scenes in daily lives without increasing a burden to the user would be desirable.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by determining importance and priority of a task based on acoustic features of audio data associated with the task.

While previous methods of determining a task exist with respect to receiving a voice command, the present disclosure relates to determining importance and urgency of a task based on acoustic features of audio data associated with the task. The task may include initiating a communication (e.g., a telephone call) or an alert and performing a process (e.g., making or updating a calendar appointment and activities). The audio data may include voice data and ambient sounds. In particular, the audio data associated with the task includes background sound, e.g., siren, engine sounds, people talking, and ambient noises. The disclosed technology addresses the issue by analyzing the voice data or the audio data for identifying acoustic features of the voice data or the audio data, classifying the data into classes that characterizes the situation based on a level of urgency and importance. For example, voice data may include a command to perform while acoustic features of the voice data may indicate a level of stress by the speaker and the ambient noise may indicate a level of urgency of the circumstance. A machine learning processing determines importance and urgency of the task by receiving acoustic features of the audio data.

The disclosed technology includes determining audio sub-stream data of received audio input associated with a task command and generating embedding vector data and/or values of acoustic features of respective the audio sub-stream data. The disclosed technology further includes a machine learning (ML) system to determine an importance and urgency of a task based on the embedding vector data and/or the values of acoustic features. The ML system may use a regression model for sequential analysis of the acoustic features or embedding models for parallel processing. The ML model may use a neural network, e.g., a recurring neural network. As a result, the disclosed technology determines levels of urgency and importance of user utterance or audio data efficiently and accurately by focusing on classifying acoustic features of the data.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 4 illustrates an example of data structures of determining importance and urgency of a task in accordance with aspects of the present disclosure.

DETAILED DESCRIPTION

Figure 1:
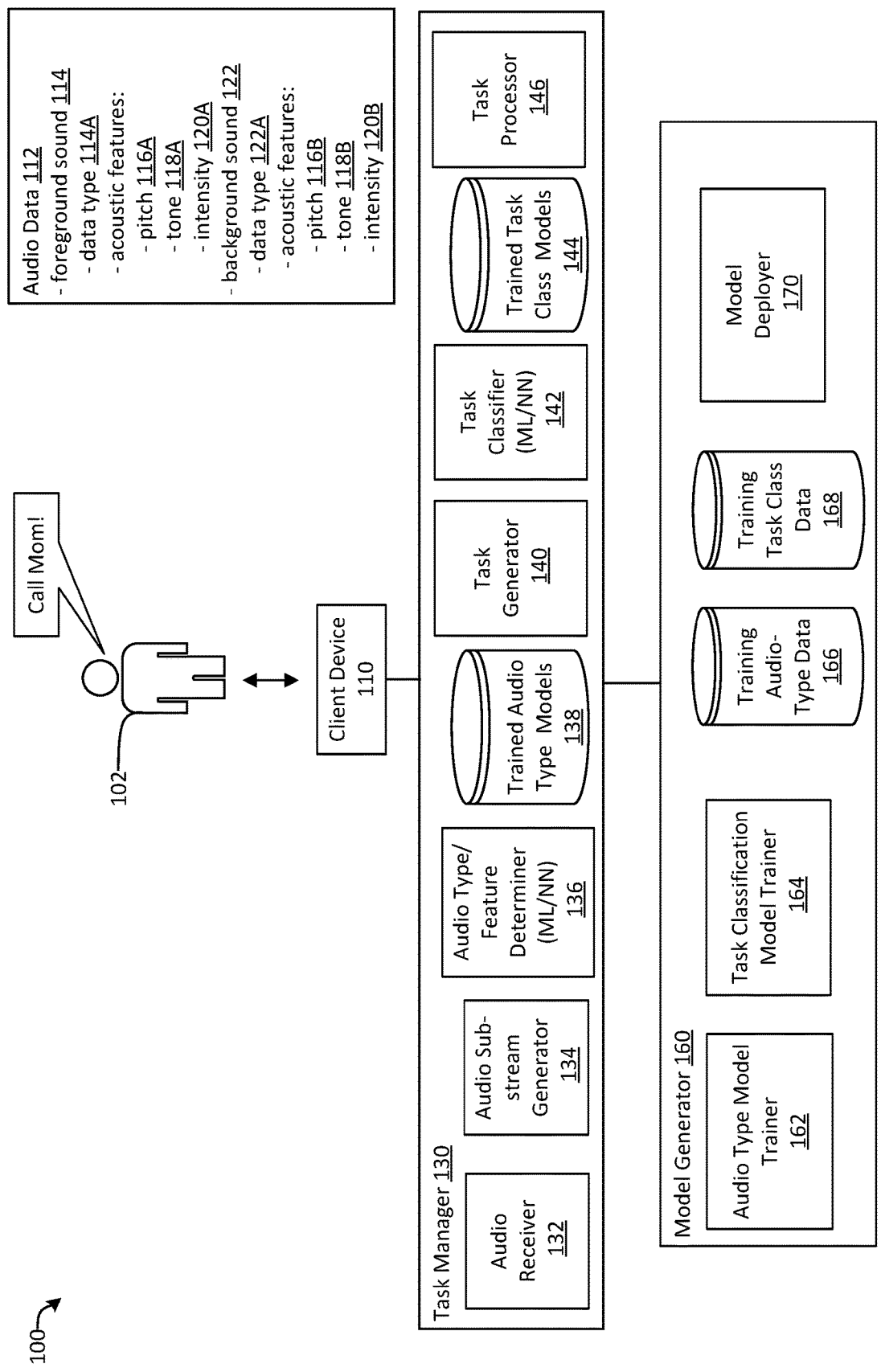
FIG. 1 illustrates an overview of an example system for determining importance and urgency of a task based on acoustic features of audio data using a machine learning model in accordance to aspects of the present disclosure.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Traditional systems generate tasks and determine importance and urgency of a task based on user interactions with devices, e.g., calendar applications and digital assistants, and relationships with other tasks. These systems generate tasks or items in to-do lists as users interact with the devices via graphical user interfaces, voice commands, and other methods as input commands. Some other systems automatically generate tasks based on predetermined set of rules or patterns of activities of the user as determined by the systems.

Systems may prioritize tasks in various ways. In some aspects, the system may prioritize tasks based on commands received from the user to prioritize. In some other aspects, the systems automatically prioritize tasks based on pre-defined rules of prioritization and pattern matching of activities against rules. Some applications prioritize tasks relative to existing tasks based on context of respective tasks. However, issues arise when users expect the systems automatically determine urgency and priority of tasks when the tasks based on a given command indicate the same or similar contexts. For example, a task with a command based on a verbal input "Call Mom" made by a user at 7 pm on Saturday night over two weekends may indicate the same level of priority of the task to call mother. The user, however, may expect one of them to be higher in priority than any other task at the time because the user was spoke "Call Mom" when she was in a car accident at 7 pm on the second Saturday night.

Traditional task management relies on receiving a command or an event based on predetermined rules for generating and prioritizing tasks. The invention determines task urgency and priority based on Vocal/Audio/Acoustic features and assigns importance, urgency, and/or priority of tasks. In aspects, tasks may be explicit entries in any To-Do or Task management applications. Additionally, or alternatively, tasks may be implicit entries extracted from emails, or set of actions requested by commands from a voice assistant. Task entries may be captured through multi-modal channels. A machine learning (ML) model uses the acoustic features (not limited to voice in the foreground audio but also the background audio). Acoustic features determine importance of tasks based on the feedback from the model. Further actions categorize the tasks based on the importance and provide the user with an improved execution of the task.

As discussed in more detail below, the present disclosure relates to determining importance and urgency of a task based on acoustic features of audio data associated with the task using a machine learning model. In particular, the acoustic features of audio data may include pitch, volume, rhythm, and the like. Audio data may be associated with a task when the audio data includes a command for the task or the task may be inferred from the audio data. The audio data may include one or more audio sub-streams. Respectively sub-streams may be associated with distinct types of audio data and context.

FIG. 1 illustrates an overview of an example system for determining importance and urgency of a task based on acoustic features of audio data using a machine learning model in accordance to aspects of the present disclosure. System 100 represents a system for machine learning model or a neural network to generate a task and determine importance, urgency, and priority of the task using a model generator and a task manager. System 100 includes a client device 110, a task manager 130, and a model generator 160. A user 102 interacts with the client device 110. The task manager 130 and the model generator 160 may be implemented as one or more servers, connected from the client device 110 via a network (not shown). Additionally, or alternatively, the task manager 130 and the model generator 160 may include one or more sets of instructions to, at least in part, execute as applications on the client device 110. The client device 110 communicates with the task manager 130. The task manager 130 includes an audio receiver 132, an audio sub-stream generator 134, an audio type/feature determiner 136, a storage that stores trained audio type models 138, a task generator 140, a task classifier 142, and a task processor 146. The task manager 130 communicates with the model generator 160. The model generator 160 generates trained models by training models for determining audio types and task classes. The model generator 160 includes an audio type model trainer 162, a task classification model trainer 164, a storage for storing training audio-type data 166, a storage for storing training task class data 168, and a model deployer 170.

The client device 110 may be a smart speaker, a smartphone, a personal computing device, or a general computing device providing input and output capabilities. The client device 110 includes input parts (e.g., one or more microphone, a video camera, touch sensors, a keyboard, etc.) and output parts (e.g., one or more speakers, a display, etc.) In aspects, the client device 110 may communicate over the network (not shown) with the task manager 130.

In aspects, the audio receiver 132 may receive audio data 112 from audio input parts (e.g., a microphone) in the client device 110. The audio receiver 132 receives the audio data 112 as a stream of audio signals. An audio sub-stream generator 134 generates one or more audio sub-streams based on the received audio data 112. In aspects, the stream of audio data 112 may include a sub-stream that represents a foreground sound 114 and one or more sub-streams of background sound 122 respectively. In aspects, the audio sub-stream generator 134 separates the stream of audio data 112 into one or more sub-streams of the background sound 122 using a technology that is similar to, but not limited to, identifying and canceling background noise data in audio data.

The audio type/feature determiner 136 uses a machine learning model or a neural network to determine a type and features of acoustics in the received audio data 112. Audio type or data type (114A and 122A) indicates types of respective sub-streams of the audio data. A type 114A of the foreground sound 114 in the audio data 112 may be voice data. A type 122A of the background sound 122 may be a siren from a police car or an ambulance, for example. In aspects, the audio type/feature determiner 136 may use a machine learning (ML) model or a neural network to determine or predict the audio type and features. The ML model or the neural network for determining audio type may use the trained audio type models 138. Acoustic features include pitch, tone, intensity, volume. The foreground voice data may include values for a pitch 116A, a tone 118A, and intensity 120A. The background siren sound may include values for a pitch 116B, a tone 118B, and intensity 120B. The audio type/feature determiner 136 determines types of respective sub-streams of the audio data 112 using a trained machine learning (ML) model. The storage for the trained audio type models 138 stores the trained ML models used by the audio type/feature determiner 136. In aspects, the trained ML model determines a type of audio data based on a set of predetermined rules to analyze the received sub-stream of audio stream data.

In aspects, the audio type/feature determiner 136 may determine an audio type and acoustic features of the audio stream data based on analyzing the audio stream data without splitting the audio stream data into audio sub-streams. This way, processing for determining the audio type and the acoustic features becomes less intensive than generating the audio sub-streams and determining the audio type and the acoustic features for respective audio sub-streams. There may be a trade-off of accuracy in determining the audio type and acoustic features based on the audio stream data because analyzing the respective audio sub-streams may enable determining the audio type and the acoustic features more accurately with more detailed analyses than using the audio stream data.

The task generator 140 generates a task based on the received audio input and the determined sub-streams of audio data 112. In aspects, the task generator 140 generates a task using the foreground sound 114 with a data type 114A (e.g., voice in foreground). For example, a task may be to call mother when the foreground sound 114 includes a data type 114A of voice and a speech made by the voice is "Call Mom."

The task classifier 142 classifies a task into one or more of predefined classes using acoustic features of sub-streams of the received audio data 112. The predefined classes are associated with importance and urgency of the task (e.g., "Important," "Not Important," "Urgent," "Not Urgent," etc.). The task classifier 142 may use a machine learning model to classify the task. The machine learning model, which may be stored in the storage for trained models 126, may determine importance and urgency of a given task using values of acoustic features of the audio data. Additionally or alternatively, the task classifier 142 may use a neural network with a set of trained parameters to classify the task. The storage for trained task classification models 144 includes the set of trained parameters used by the task classifier 142 to classify the task. The neural network may use embeddings that at least represent acoustic features of the received audio data 112. In aspects, embeddings represent a set of multi-dimensional vectors or mappings of acoustic features to vectors of continuous numbers. The Audio sub-stream generator 134 may convert audio signals of the sub-streams of the received audio data 112 into embeddings as input to the neural network in the task classifier 142. The task classifier 142 may use the neural network to determine a likelihood of the classifications by determining probability distributions for respective classes associated with importance and urgency of the task. For example, the task classifier 142 classifies a task in a class "Important" and not "Not Important" when the probability distribution indicates the class "Important" as more probable than the class "Not Important."

In aspects, the task classifier 142 may use a regression data model to determine importance, urgency, and a priority of classes. In particular, the regression data model refers to acoustic features of an audio sub-stream at a preceding time. For example, a task with a background sound of a siren that becomes louder over time may be classified as being important and/or urgent. The task classifier 142 may analyze the acoustic feature of the siren background audio sub-stream regressively over time duration of the audio input. In aspects, a pitch and a volume of the audio sub-stream changes over time to determine that the source of the siren (e.g., a fire truck) is coming closer.

The task processor 146 processes and executes the generated task at a determined level of importance and urgency. In aspects, the task processor 146 interacts with a telephonic application to place a phone call based on the task. Additionally, or alternatively, the task processor 146 may interface with external applications including but not limited to calendar applications, task management applications (not shown), and telecommunication applications, and transmit the task according to the determined classes of importance and urgency of the task. When the classes of the task indicate the task as "urgent," the task processor 146 may initiate performing the task with urgency, for example. In some other aspects, the task processor 146 may cause the calendar application to indicate the task with highlights or an emphasis when the determined class of the task indicates the task as "important."

The model generator 160 generates trained audio type models 138 and trained task classification models 144 and deploys the trained data to the storage for the trained models 137 in the task manager 130. The audio type model trainer trains audio type model using a training set of correct audio data and types. The training set may include, for example, a pair of audio stream data with a voice speech and a type "voice." Another training data may be another pair of audio stream data that includes siren and a type "siren." The audio type model trainer 162 may store trained audio type data in the storage for training audio type data 166.

The task classification model trainer 164 trains task classification models using received training data. The training data for task classification may include a set of acoustic features of one or more sub-streams of audio data and a correct classification for importance, urgency, and priority. The classification for priority may include more than two classes of priority for ranking. Trained data for classification may include a set of rules or conditions (i.e., a trained model) of values for acoustic features and a designated class. Additionally or alternatively, the trained data for classification may include a set of trained parameters (or a trained model) for a neural network that receives embeddings of audio data as input and determines one or more classes of the audio data for importance, urgency, and priority.

The model deployer 170 deploys the trained audio type data and the trained data for classification to the task manager 130 by storing the trained audio type data in the storage for the trained audio type models 138 and the trained data for task classification in the storage for trained task classification models 144.

As will be appreciated, the various methods, devices, applications, features, etc., described with respect to FIG. 1 are not intended to limit the system 100 to being performed by the particular applications and features described. Accordingly, additional configurations may be used to practice the methods and systems herein and/or features and applications described may be excluded without departing from the methods and systems disclosed herein.

Figure 2:
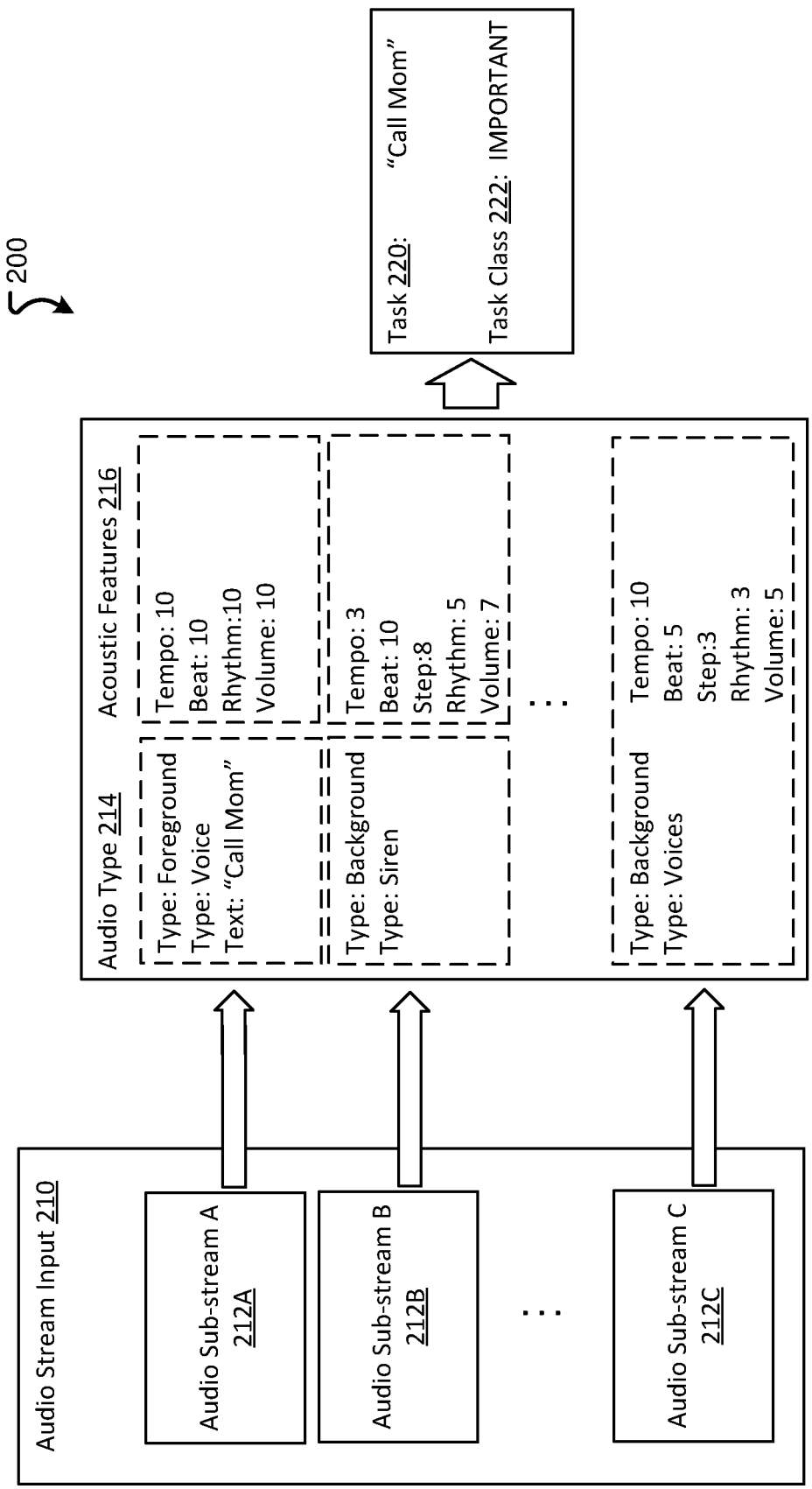
FIG. 2 illustrates an example of data structures of determining importance and urgency of a task based on acoustic features of audio data in accordance with aspects of the present disclosure.

FIG. 2 illustrates an example of data structures of determining importance and urgency of a task based on acoustic features of audio data in accordance with aspects of the present disclosure. The data structure 200 in the example includes three types of data structures: an audio stream input 210, a set of audio type 214 and acoustic features 216, and a task 220 and its task class 222.

The audio stream input 210 represent audio input data from the client device 110, received by the audio receiver 132 of the task manager 130. The audio stream input 210 includes multiple audio sub-streams (e.g., audio sub-stream A 212A, audio sub-stream B 212B, and audio sub-stream C 212C, for example). Each audio sub-stream includes a set of audio signals during a time duration of the audio stream input 210. For example, the set of audio signals may include amplitude values for respective audio frequencies. In aspects, each of the audio sub-streams represents an audio data stream of a distinct sound. For example, the distinct sound may be a voice, a siren of a fire engine, people's voices that are indistinguishable, a sound of hand clapping, a gun shooting, and others. Sound processing technologies (e.g., noise canceling, speaker recognition) may identify and isolate various types of audio into distinct audio sub-streams.

The audio type 214 includes one or more types of the respective audio sub-streams. For audio sub-stream A 212A, audio type 214 includes a foreground voice sound with a speech text of "Call Mom." Acoustic features 216 of the audio sub-stream A 212A include a temp of a value 10, a beat at 10, a rhythm at 10, and a volume at 10. In aspects, a larger value of each acoustic feature indicates a larger magnitude of the feature. Audio sub-stream B 212B translates into an audio type of a siren in background, with acoustic features 216 of a tempo at 3, a beat at 10, a step of 78, a rhythm at 5, and a volume at 7. Audio sub-stream C 212C translates into an audio type of people voices (indistinguishable) in background, with acoustic features of a tempo at 10, a beat at 5, a step at 3, a rhythm at 3, and a volume at 5.

Based on the audio type 214 of the combination of the audio type 214 across the multiple sub-streams of the audio steam input 210, the present invention generates a task 220 of, for example, "Call Mom" that is to place a telephone call to Mom as the callee (or a destination of the call). The present invention further determines importance of the task as a task class based on the set of acoustic features 216 across the multiple audio sub-streams of the audio stream input 210: "IMPORTANT." Additionally or alternatively, the present invention determines a class associated with urgency and priority of the task based on acoustic features 216. For example, the task 220 to "Call Mom" may be classified as "urgent" when one of the background sound sub-streams includes a siren from a fire engine. The task classifier (an ML or an NN) 142 may be trained to determine such that calling mother when the received audio input includes a siren from a fire engine in the background is urgent. In some other aspects, the task 220 to "Call Mom" may be "not urgent" when the received audio stream input 210 does not include a siren in any of the audio sub-streams. In some other aspects, the classification may take into account a context of the task 220 (e.g., making a telephone call to Mom), in addition to the acoustic features.

Figure 3:
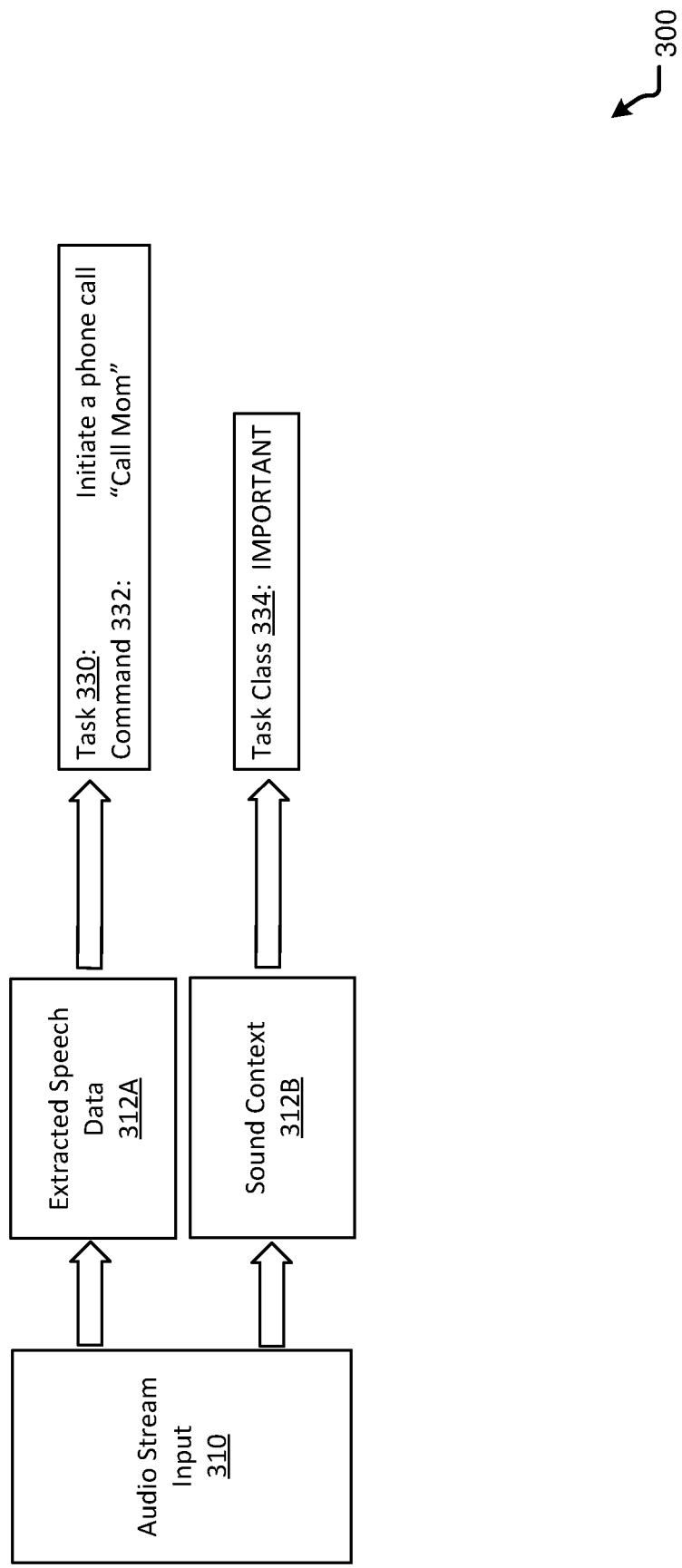
FIG. 3 illustrates an example of data structures of determining importance and urgency of a task by extracting speech data and context of audio data in accordance with aspects of the present disclosure.

FIG. 3 illustrates an example of data structures of determining importance and urgency of a task by extracting speech data and context of audio data in accordance with aspects of the present disclosure. Additionally or alternatively, the present disclosure extracts, from the audio stream input 310, speech data 312A and a sound context 312B. In aspects, the speech data 312A may be based on the foreground sound of the audio stream input 310. The sound context 312B may be based on sound acoustics in the background audio sub-streams. The present invention generates a task 330 (e.g., to initiate a phone call, for example) with a command 332 to "Call Mom." Concurrently, the present disclosure determines a task class 334 as being IMPORTANT.

In aspects, the present disclosure converts the audio stream input 310 into a set of embeddings (i.e., multiple-dimensional vectors). The task classifier (e.g., using a neural network with a trained model) 142 classifies the sound context into one or more classes that indicate importance, urgency, and priority of the task. In the example of FIG. 3, the task class 334 indicates "important." Additionally or alternatively, the task class 334 may indicate other values including "not important," "urgent," "not urgent," and a priority level (e.g., from a value ranging from 1 to 10 in the order of priority of the task).

FIG. 4 illustrates an example of data structures of determining importance and urgency of a task in accordance with aspects of the present disclosure. FIG. 4 illustrates values of respective classifications of audio stream input: task classification 410, task ranking 420, and classification rules 430.

Task classification 410 may include classes based on importance 412 and urgency 414. Classes of importance 412 may be one of "important" and "not important." Classes of urgency 414 may be one of "urgent" and "not urgent."

Task ranking 420 may include ranking scores to determine a priority of a task. An urgency score 422 takes a value from 1 and 5 with the 5 being the most urgent for the task. An importance score 424 takes a value between 1 and 5 with the 5 being the most important task.

Classification rules 430 include a set of rules to classify tasks. In aspects, the present disclosure determines a classification based on a set of conditions. As an example, the classification rule 430 indicates three acoustic features items as a set of conditions to determine a class. The exemplar classification rule 430 indicates that a foreground pitch greater than 7, a foreground volume greater than 9, and a background audio type of "siren." The rule specifies that the set of conditions translate into a class that indicates "urgent" and "important." In aspects, the classification rules 430 may be used to train a machine learning model for the task classifier 142.

Figure 5:
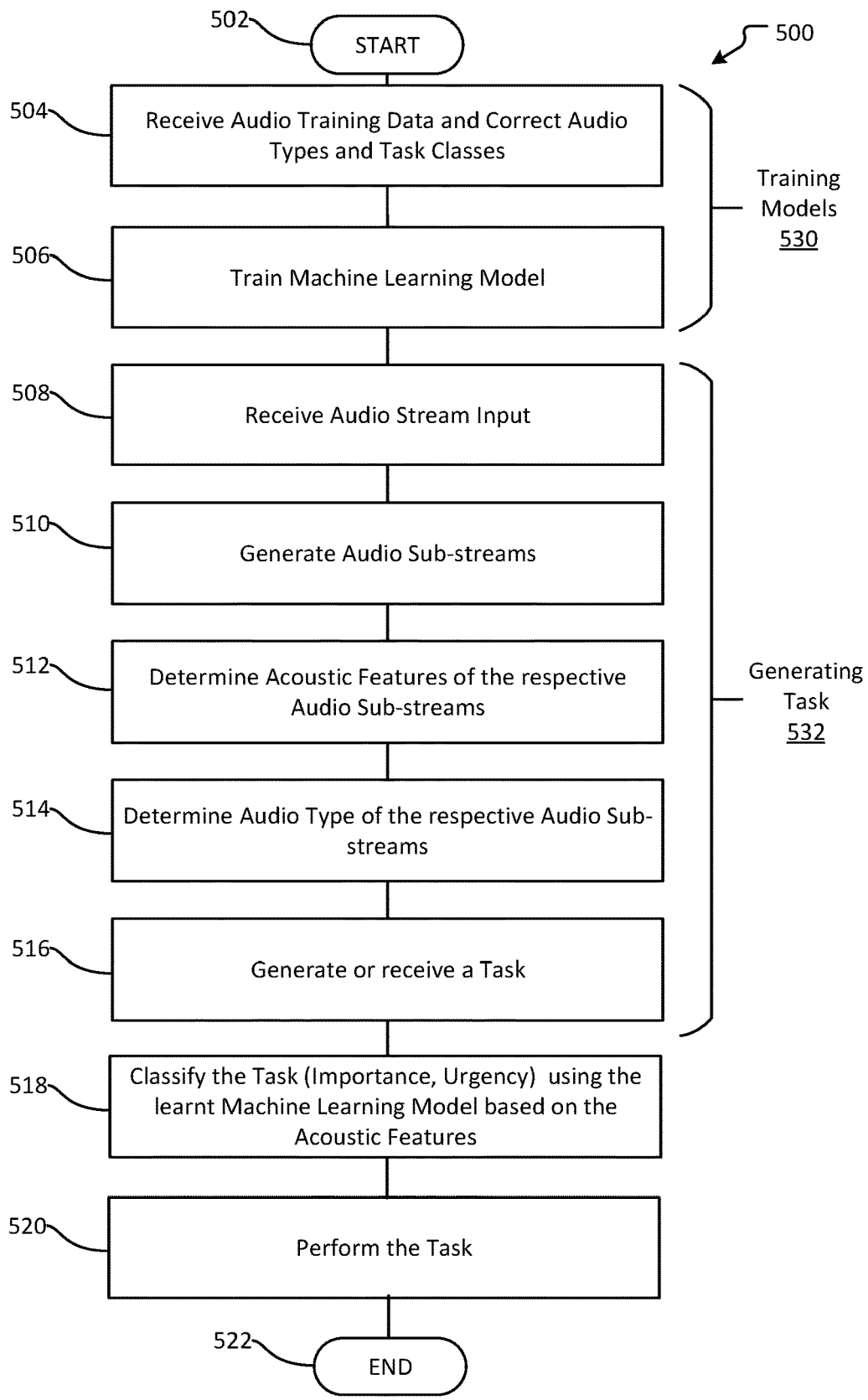
FIG. 5 illustrates an example of method of determining importance and urgency of a task based on acoustic features of audio data associated with the task using a machine learning model in accordance with aspects of the present disclosure.

FIG. 5 illustrates an example of method of determining importance and urgency of a task based on acoustic features of audio data associated with the task using a machine learning model in accordance with aspects of the present disclosure.

A general order of the operations for the method 500 is shown in FIG. 5. Generally, the method 500 begins with start operation 502 and ends with end operation 522. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3, 4, 6, 7, and 8A-B.

Following start operation 502, the method 500 begins with receive operation 504, which receives audio training data including sub-streams of audio data and acoustic features with correct audio types and task classes. For example, the audio training data may include audio data with a person's voice shouting a phrase "Call Mom" in the foreground audio while there is a siren from a fire engine and people's indistinguishable voices, both in the background audio.

Train operation 506 trains a machine learning model using the received audio training data. In particular, the machine learning model for determining an audio type may be trained using the exemplar training data to train a voice shouting "Call Mom." Another machine learning model may be trained for classifying the task into importance, urgency, and priority. A set of acoustic features of the training data may be used to train the machine learning model to determine a class of the task "Call Mom" to be "important" when the acoustic features of the foreground voice includes a large volume at high pitch (i.e., "shouting or screaming."). Additionally the train operation 506 train the machine learning model to classify the task "Call Mom" to be "urgent" when the audio input includes a siren by a fire engine in the background. In aspects, the steps from 504 to 506 are for training models for determining audio types and a class of the task. In some aspects, the train operation 506 trains the machine learning model for task classifications using training data where the audio stream data includes a foreground audio type of a speech with a word "Stop" with acoustic features of the foreground audio includes a high pitch, a short bursting rhythm, and a high intensity. The training data may specify a set of classes "important" and "urgent." Accordingly, use of the trained task classification model may cause the task performer to immediately stop ongoing task (e.g., playing a music) without confirming the command with the user.

Receive operation 508 receives audio stream input. In aspects, the audio receiver 132 of the task manager 130 may receive the audio stream input. The audio stream input may include multiple audio sub-streams, each representing a distinct type of audio data (e.g., a foreground voice, a background siren, etc.).

Generate operation 510 generates audio sub-streams based on the received audio stream input. The generate operation 510 may split the received audio stream input into sub-streams by identifying distinct types of audio data and splitting the audio stream into a set of sub-streams. In aspects, the generate operation 510 uses a technology that is similar to identify noises in a stream of audio or sound used in noise cancellation to identify and generate sub-streams of the audio stream. In some other aspects, the client device may include plurality of audio input device (e.g., directional microphones) to receive audio data and identify distinct sources of the sound based on directions of the audio input devices. Audio stream data may be separated into sub-streams based on audio sources identified by the directional audio input.

In aspects, the generation operation 510 splits the received audio stream input to a fixed time length (e.g., 10 seconds) segments. Log-mel filter bank (LMFB) features may be used as audio features from the received audio stream input. An input audio waveform may be analyzed with Sparse Fast Fourier Transform (SFFT) points in a fixed window size of samples and a frameshift (e.g., 2048 SFFT points, a window size of 2048 samples, and a frameshift of 1024 samples). In aspects, use of some software packages or libraries for audio analysis (e.g., Librosa, See, B. McFee, C. Raffel, D. Liang, D. P. Ellis, M. McVicar, E. Battenberg, and O. Nieto, "librosa: Audio and music signal analysis in python," in Proceedings of the 14th python in science conference, vol. 8, 2015) may determine LMFB features. The Hidden Markov Toolkit (HTK) formula definition of the Mel scale may be adopted to determine a pitch of the audio stream input. Sampling rates may depend on the model size constraints. For example, there may be two tasks for classification of Urgency and Importance. There may be a final spectrogram which has 431-time bins and the number of frequency bins is 128 in both tasks. Log-mel deltas and delta-deltas without padding may also be computed, thereby reducing the number of time samples to 423 samples. Accordingly, this results in the final tensor size of 423×128× 3. In aspects, the generation operation 510 may normalize or scale each feature value into a value between zero and one before providing the speech feature tensors into the Convolutional Neural Network (CNN) classifier.

The input tensors are fed into distinct classifiers that use the fully convolutional neural network (FCNN). For example, FCNN may include 910 stacked convolutional layers with small kernel sizes (e.g., VGG architecture, See, K. Simonyan and A. Zisserman, "Very deep convolutional networks for large-scale image recognition," arXiv preprint arXiv:1409.1556, 2014.). Each convolutional layer is followed by a Batch Normalization operation and the rectified linear activation function (e.g., the Rectified Linear Unit (ReLU) activation layer). In the convolutional layers 5 to 10, a Dropout may be used to alleviate possible issues with overfitting after the fourth and eighth Rectified Linear Unit (ReLU) layers a 2×2 max-pooling layer is appended. In addition for each output channel attention is applied over each output channel of the last convolutional layer. A global pooling layer, followed by a softmax layer generates the final classification decision for each task.

For example, an audio sub-stream may represent a foreground voice with a speech input of "Call Mom." Another audio sub-stream may represent a background sound of a siren from a fire engine. Yet another audio sub-stream may represent a background sound of people talking but words spoken by one person in the background are indistinguishable from words spoken by another in the background.

Determine operation 512 determines acoustic features of the respective audio sub-streams. The acoustic features may include but not limited to a tempo, a beat, a rhythm, a step, and a volume of the respective audio sub-streams. In some aspects, an audio with a speech voice type may include a pitch and a speed of the speech as acoustic features to determine whether the speaker was shouting, screaming, or talking in a casual manner.

Determine operation 514 determines audio types of the respective audio sub-streams. The audio types may include whether an audio sub-stream is a foreground audio or a background audio. The audio types may also include a voice, a siren from a fire engine or a first responder vehicle, indistinguishable voices of a crowd in the background, a crashing sound of objects, and others. An audio stream input may include more than one audio sub-streams. Each audio sub-stream may be associated with an audio type that is distinct from other audio sub-streams. The determine operation 514 may determine the audio type using a machine learning model. The machine learning model may have been trained in the train operation 506.

Generation operation 516 generates a task based on the audio input. For example, when the audio input includes a foreground audio of a speech voice and the speech text is "Call Mom," the generation operation 516 may generate a task for initiating a telephone call to Mom using a predetermined phonebook. In some other aspects, the generation operation 516 may generate a task based on the background audio of the audio input. For example, the digital assistant with the client device is operating in a vacant house. The audio input may include a background yet high-volume audio of a siren from a fire engine and a sound of someone banging on the door of the house. The generation operation 516 may automatically generate a task to call the owner of the vacant house to notify the owner a possible emergency at the vacant house. The steps from 508 to 516 correspond to generating a task 532. Additionally, or alternatively, the generation operation 516 may receive an existing task for revising a class of the existing task, for example. The generation operation 516 may interact with external applications that manage tasks (e.g., calendar applications, to-do list applications, and appointment scheduler applications).

Classify operation 518 classifies the task based on its importance, urgency, and priority based on sound acoustics. In aspects, the classify operation 518 may determine a class of the task. The classify operation 518 may use a learnt machine learning model for classifying a task based on acoustic features. For example, a task for placing a call to Mom may include a "Call Mom" voice speech in the foreground sound with a high volume and high pitch (e.g., screaming) acoustic features along with a background sound of a siren from a fire engine based on the acoustic features. The classify operation 518 classifies the task as "IMPORTANT" and "URGENT" based on the combination of acoustic features. In aspects, a combination of a foreground voice sound "Call 911" with acoustic features of the background noise indicating alarms, sirens, explosions, etc., would be more important than the same foreground voice sound without background noises. Classify operation 518 classifies the task accordingly by analyzing both the foreground audio (e.g., voice) data and acoustics of the background audio data. In some other aspects, the classifying operation 518 classifies the task to stop playing music (e.g., on a smart speaker) as "URGENT" when the foreground voice speech is "STOP THAT" with its acoustic features (e.g., a high pitch, unstable tone, a speed above a predetermined threshold, etc.) of the voice sound indicating a high level of stress by the speaker. This way, the classify operation 518 may classify, for example, a voice speech with certain acoustic features as shouting under stress, thus the task is URGENT. A level of stress may be among attributes of speech or voice data as determined based on acoustic features of the voice data.

In aspects, there may be one classifier (i.e., classification $C_{urg}$ task) for urgency (where urgency classes outcome are $F_{urg}$). Another classifier may classify importance (i.e., $C_{imp}$ task importance classes outcome labels are $F_{imp}$). Results of the two classifiers may be combined using the following equation (1):

$$\text{Class}(x) = \text{argmax} q, (p \in C_{urg}, q \in C_{imp}, p \supset q) F_{urg} p(x) \\ *F_{imp} q(x) \quad (1)$$

In aspects, the training of splitting the audio stream input may be based on training data with recommendation of correct answers. For example, there may be 14,000 audio clips for training models marked with labels of classes for "Urgency" and "Importance." There may be 2,500 test audio clips. Data augmentation techniques may be used to improve models. Stochastic gradient descent (SGD) with a cosine-decay-restart learning rate scheduler may be used to train the models. The maximum and minimum learning rates may be 0.1 and 1e-5, respectively. In aspects without validation data, the average output of models when learning rate hits around the minimum number may be used. For example, Pyrotch or Keras may be used to implement the CNN-based models for classifications. Upon completing the training, the networks may be used by applying the networks to smaller audio segments (e.g., 200 milliseconds) for inference.

In some other aspects, there may be an audio stream without foreground sound but only a set of background sounds. The generation operation 517 generated a task to make a telephone call to an owner of a house. The set of background sounds may include a siren from a fire engine and another background sound of someone banging strongly on the door. The classify operation 518 may classify the task as "IMPORTANT" and "URGENT." In some aspects, the classify operation 518 may determine a level of priority for performing a task based on acoustic features of the audio stream.

Perform operation 520 performs the task at the classified level of importance and/or urgency. The perform operation 520 may interact with external servers and devices to perform the tasks based on a level of importance, urgency, and priority as classified by the classify operation 518. For example, the perform operation 520 may interact with an external telephony server to initiate a phone call with a determined level of urgency at a timing that reflects a level of importance. The perform operation 520 performs a task that is both important and urgent may start performing the task at early as possible, before performing other tasks. In some other aspects, the perform operation 520 may interact with an emails sever to transmit emails. In yet some other aspects, the perform operation 520 may save the task in a calendar application or a task management application.

Figure 6:
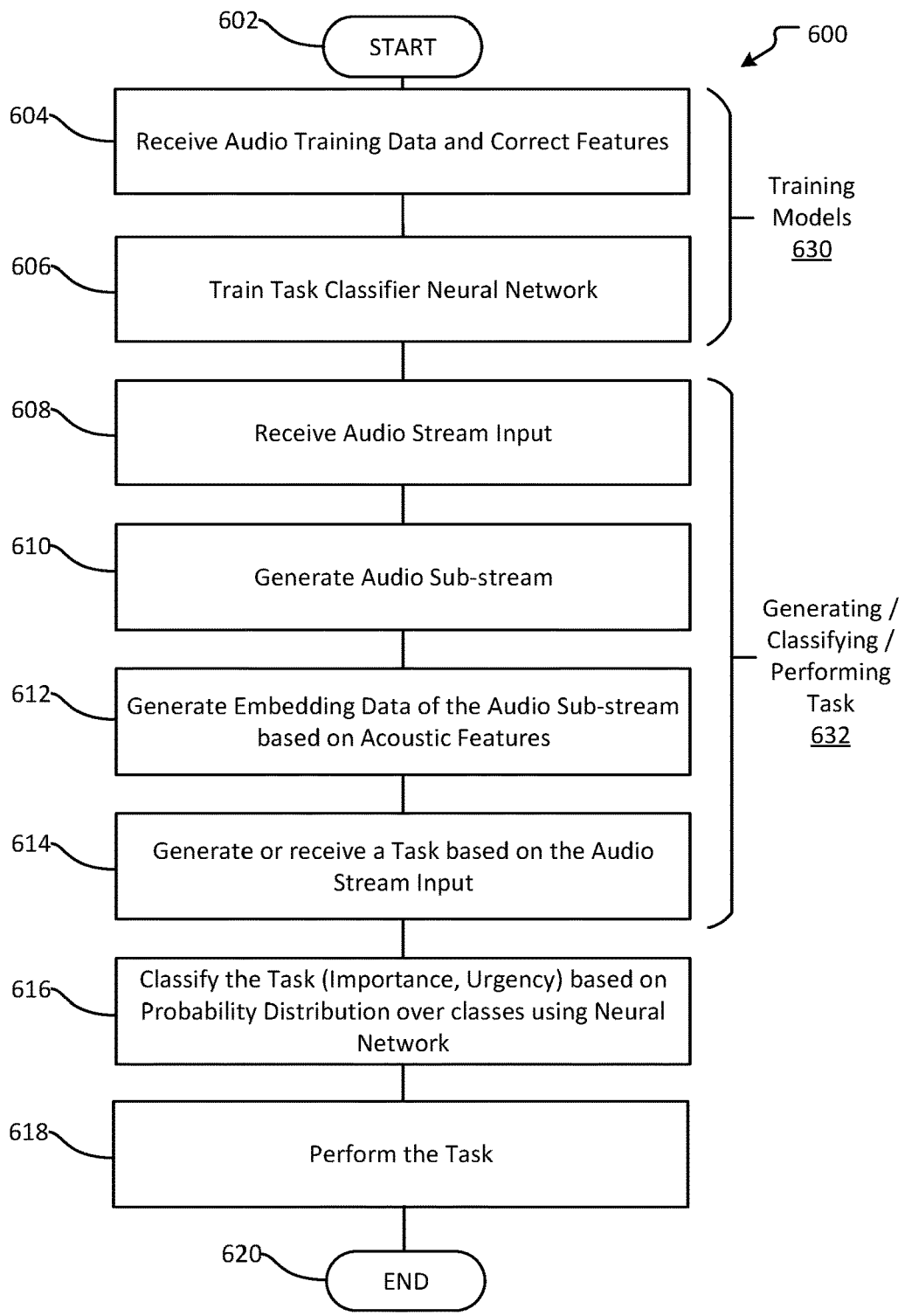
FIG. 6 illustrates an example of method of determining importance and urgency of a task based on acoustic features of audio data associated with the task using embedding of the audio data and a neural network in accordance with aspects of the present disclosure.

FIG. 6 is example of method of determining importance and urgency of a task based on acoustic features of audio data associated with the task using embedding of the audio data and a neural network in accordance with aspects of the present disclosure.

A general order of the operations for the method 600 is shown in FIG. 6. Generally, the method 600 begins with start operation 602 and ends with end operation 620. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2, 3, 4, 5, 7, and 8A-B.

Following start operation 602, the method 600 begins with receive operation 604, which receives training data. The training data include sub-streams of audio data and acoustic features with correct audio types and task classes. For example, the audio training data may include audio data with a person's voice shouting a phrase "Call Mom" in the foreground audio while there is a siren from a fire engine and people's indistinguishable voices, both in the background audio.

Train operation 606 trains a task classifier neural network using the received audio training data. In particular, the neural network for determining an audio type may be trained using the exemplar training data to train a voice shouting "Call Mom." Another neural network may be trained for classifying the task into importance, urgency, and priority. A set of acoustic features of the training data may be used to train the machine learning model to determine a class of the task "Call Mom" to be IMPORTANT when the acoustic features of the foreground voice includes a large volume at high pitch (i.e., "shouting or screaming."). Additionally the train operation 606 train the neural network to classify the task "Call Mom" to be URGENT when the audio input includes a siren by a fire engine in the background. In aspects, the steps from 604 to 606 are for training models for determining audio types and classifying tasks.

Receive operation 608 receives audio stream input. In aspects, the audio receiver 132 of the task manager 130 may receive the audio stream input. The audio stream input may include multiple audio sub-streams, each representing a distinct type of audio data (e.g., a foreground voice, a background siren, etc.).

Generate operation 610 generates audio sub-streams based on the received audio stream input. The generate operation 610 may split the received audio stream input into sub-streams by identifying distinct types of audio data and splitting the audio stream into a set of sub-streams. For example, an audio sub-stream may represent a foreground voice with a speech input of "Call Mom." Another audio sub-stream may represent a background sound of a siren from a fire engine. Yet another audio sub-stream may represent a background sound of people talking but words spoken by one person in the background are indistinguishable from words spoken by another in the background.

Generate operation 612 generates embeddings of respective audio sub-streams as input to the classifier (i.e., a neural network). In aspects, the embeddings represents multi-dimensional vectors. Each dimension of the vectors associated with an acoustic feature and other parameters that characterize the audio stream and its audio sub-streams.

Generate operation 614 generates a task based on the audio input. For example, when the audio input includes a foreground audio of a speech voice and the speech text is "Call Mom," the generation operation 614 may generate a task for initiating a telephone call to Mom using a predetermined phonebook. In some other aspects, the generation operation 614 may generate a task based on the background audio of the audio input. For example, the digital assistant with the client device is placed in a vacant house. The audio input may include a background yet high-volume audio of a siren from a fire engine and a sound of someone banging on the door of the house. The generation operation 614 may automatically generate a task to call the owner of the vacant house to notify the owner a possible emergency at the vacant house. The steps from 608 to 616 correspond to generating a task 632. Additionally, or alternatively, the generation operation 614 may receive an existing task for revising a class of the existing task, for example. The generation operation 614 may interact with external applications that manage tasks (e.g., calendar applications, to-do list applications, and appointment scheduler applications).

The classify operation 616 classifies the task based on its importance, urgency, and priority based on sound acoustics. In aspects, the classify operation 616 may determine a class of the task. The classify operation 616 may use a neural network (e.g., a multi-layered, recurring neural network) using the embeddings as input for determining a class of a task based on acoustic features. For example, a task for placing a call to Mom may include a "Call Mom" voice speech in the foreground sound with a high volume and high pitch (e.g., screaming) acoustic features along with a background sound of a siren from a fire engine based on the acoustic features. The classify operation 616 classifies the task as "IMPORTANT" and "URGENT" based on the combination of acoustic features. The neural network may use a trained set of parameters as trained by the train operation 606.

Perform operation 618 performs the task according to the determined class. The perform operation 618 may interact with external servers and devices to perform the tasks based on a level of importance, urgency, and priority as classified by the classify operation 616. For example, the perform operation 618 may interact with an external telephony server to initiate a phone call with a determined level of urgency at a timing that reflects a level of importance. The perform operation 618 performs a task that is both important and urgent may start performing the task at early as possible, before performing other tasks. In some other aspects, the perform operation 618 may interact with an emails sever to transmit emails. In yet some other aspects, the perform operation 618 may save the task in a calendar application or a task management application. In aspects, method 600 may end with end operation 620. In aspects, the perform operation 618 may update a position of the task on a to-do list in a to-do list application according to the class. The position of the task may indicate a ranked level of importance and/or urgency of tasks on the to-do list.

As should be appreciated, operations 602-620 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 7:
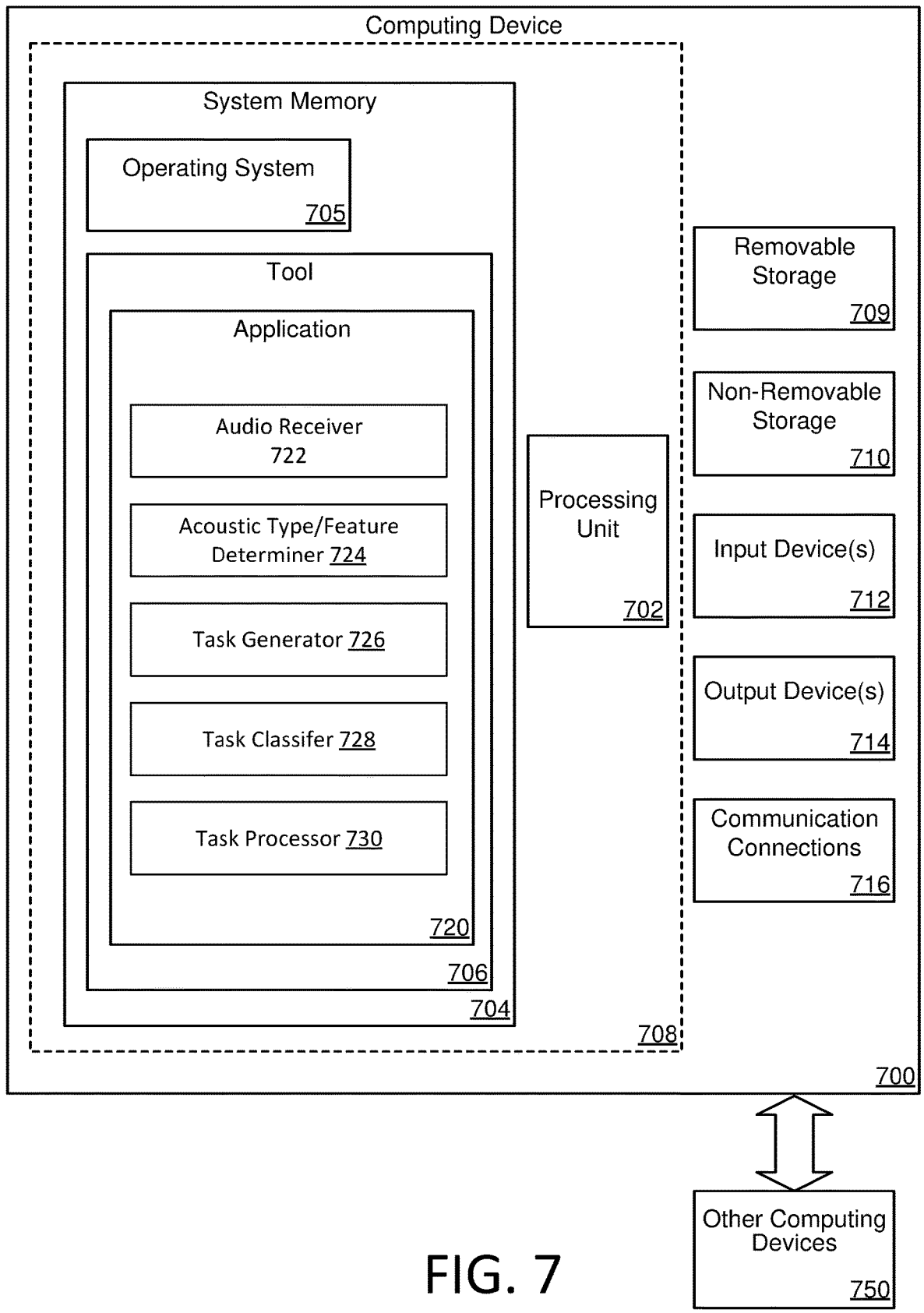
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes an audio receiver 722, an acoustic type/feature determiner 724, a task generator 726, a task classifier 728, and a task processor 730, as described in more detail with regard to FIG. 1. Other program tools that may be used in accordance with aspects of the present disclosure may include electronic mail and contacts applications, task management applications, calendar applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
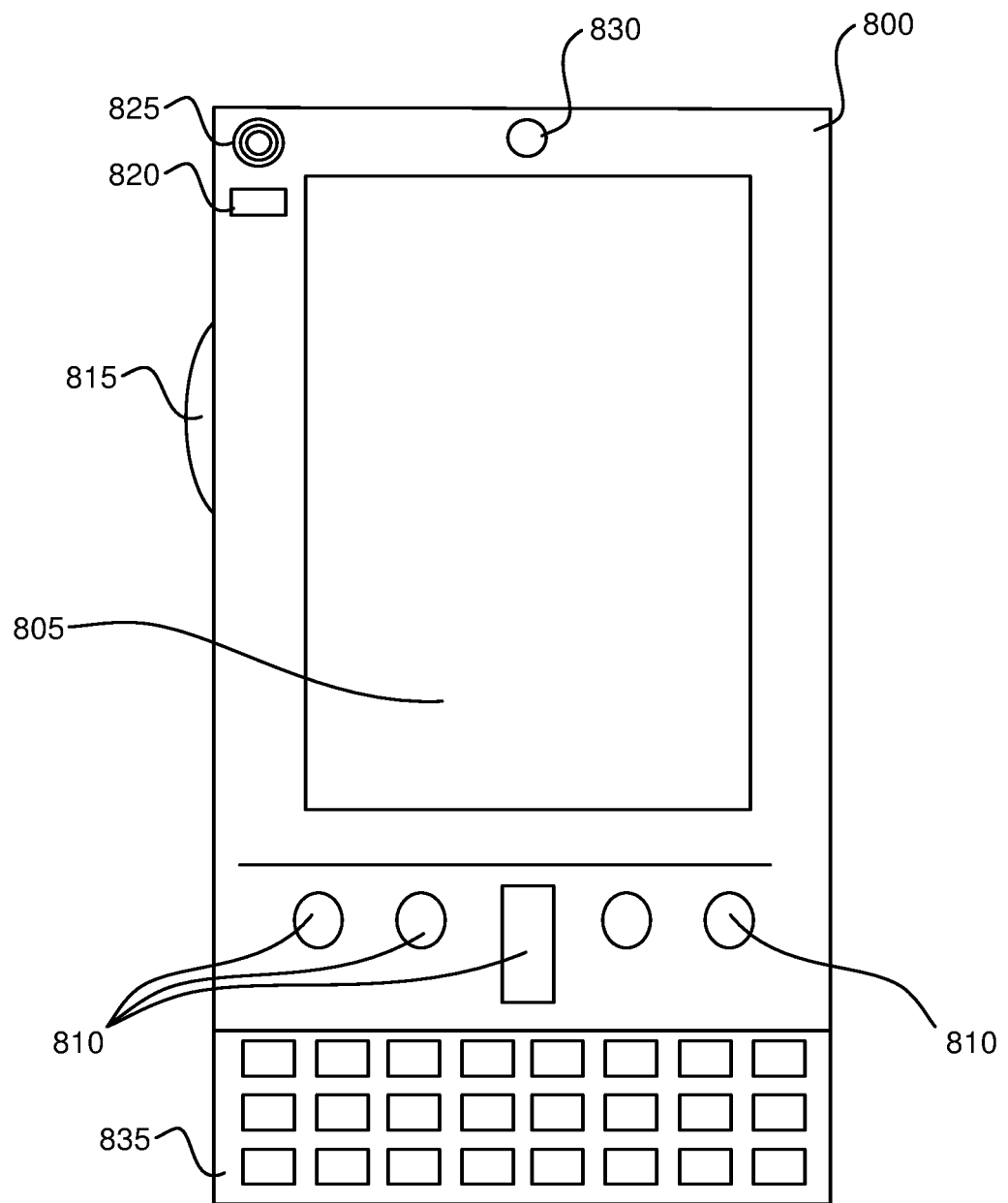
FIG. 8A is a simplified diagram of a mobile computing device with which aspects of the present disclosure may be practiced.
Figure 8B:
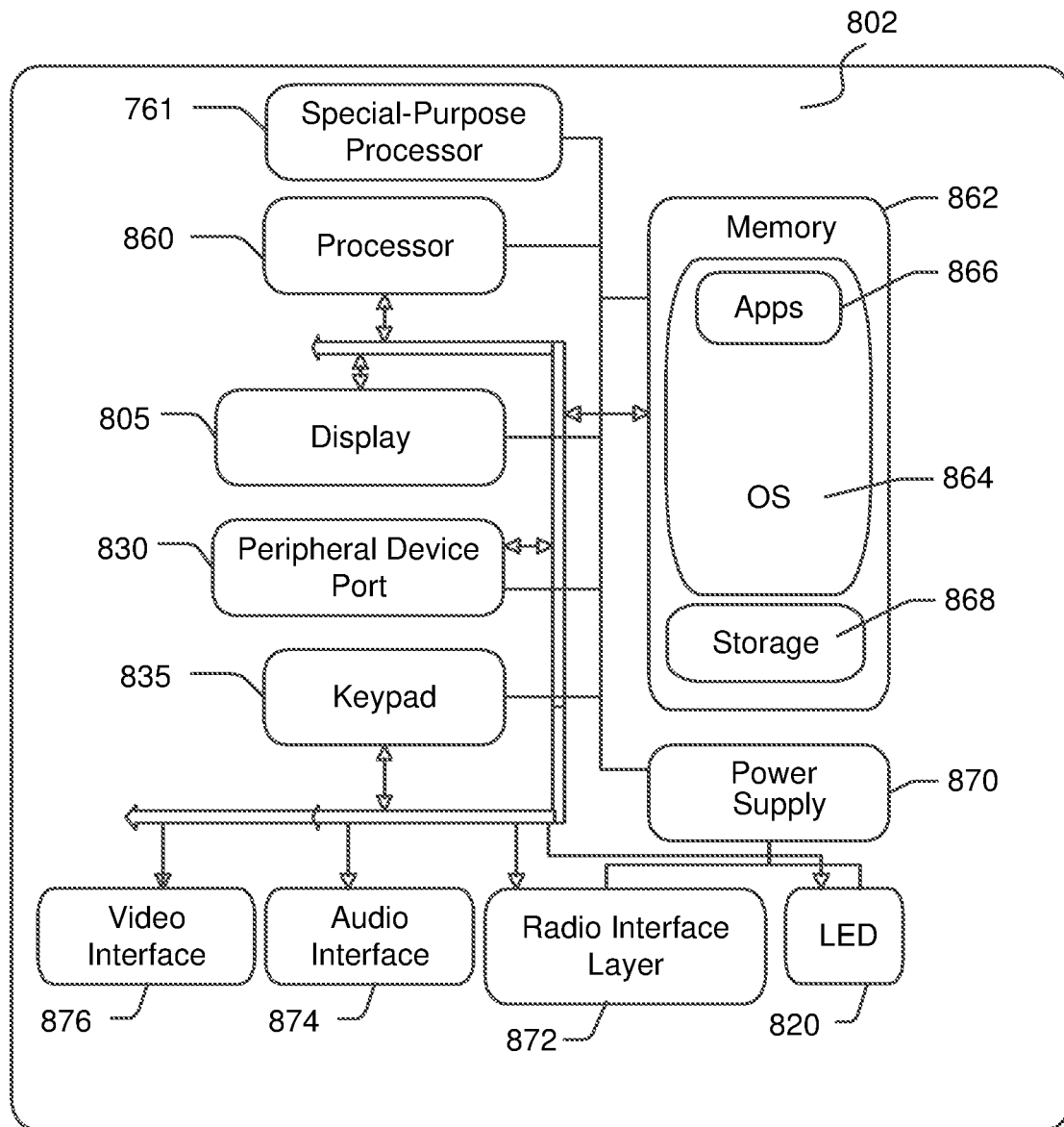
FIG. 8B is another simplified block diagram of a mobile computing device with which aspects of the present disclosure may be practiced.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., a task manager 130 and a model generator 160 in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/ players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way.

The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

As will be understood from the foregoing disclosure, one aspect of the technology relates to a computer-implemented method of determining a class of a task based on acoustic features of audio data associated with the task. The method comprises receiving audio input, wherein the audio input is associated with a task, determining one or more acoustic features of the received audio input, determining, based on the one or more acoustic features, a class of the task, wherein the class of the task indicates with at least either importance or urgency, and performing the task according to the class of the task. The method further comprises generating, based on the received audio input, a plurality of audio sub-streams, determining the one or more acoustic features corresponding to one or more of the generated plurality of audio sub-streams, determining, based on the plurality of audio sub-streams, an audio type, generating, based on the audio type, the task, and determining, based on the one or more acoustic features, a class of the task using a trained machine learning model for classifying tasks, wherein the class of the task is associated with importance and urgency of the task. The method further comprises receiving a set of audio type data for training, wherein the set of audio type data includes correct audio types associated with a set of audio data, and training, based on the received set of audio type data for training, a machine learning model for determining an audio type of the audio input. The method further comprises receiving a set of task classification data for training, wherein the set of task classification data for training includes at least one correct class of the task associated with a set of acoustic features, wherein the class of the task indicates one or more of importance, urgency, and priority, and wherein the set of acoustic features include at least a pitch, a rhythm, and intensity of the audio data, and training, based on the received set of task classification data for training, a machine learning model for determining the class based on the acoustic features, wherein the class includes one or more of: important, not important, urgent, not urgent, and a level of priority. The method further comprises generating, based on the generated plurality of audio sub-streams, an embedding of the audio data, wherein the embedding is associated with a multi-dimensional vector representation of the one or more acoustic features of the generated plurality of audio sub-streams, and wherein the trained machine learning model for classifying tasks uses a neural network. The trained machine learning model is based on a regression model for regressively classifying the task based on acoustic features of at least one of the plurality of audio sub-streams over time. The one or more acoustic features include one or more of: a volume, a pitch, a tone, or intensity. The classification of the task includes one or more of important, not important, urgent, or not urgent.

Another aspect of the technology relates to a system. The system comprises a processor, and a memory storing computer-executable instructions that when executed by the processor cause the system to: receiving audio input, receiving the task, wherein the task is associated with the received audio input, determining one or more acoustic features of the received audio input, determining, based on the one or more acoustic features, a class of a task, wherein the class of the task indicates with at least either importance or urgency, and performing the task according to the class of the task. The computer-executable instructions further cause the system to: generate, based on the received audio input, a plurality of audio sub-streams, determine the one or more acoustic features corresponding to one or more of the generated plurality of audio sub-streams, determine, based on the plurality of audio sub-streams, an audio type of the received audio input, generate, based on the audio type, the task, and determine, based on the one or more acoustic features, a class of the task using a trained machine learning model for classifying tasks, wherein the class of the task is associated with importance and urgency of the task. The computer-executable instructions further cause the system to: receive a set of audio type data for training, wherein the set of audio type data includes correct audio types associated with a set of audio data, and train, based on the received set of audio type data for training, a machine learning model for determining an audio type of the audio input. The computer-executable instructions further cause the system to: receive a set of task classification data for training, wherein the set of task classification data for training includes at least one correct class of the task associated with a set of acoustic features, wherein the class indicate one or more of importance, urgency, and priority, and wherein the set of acoustic features include at least a pitch, a rhythm, and an intensity of audio data, and train, based on the received set of task classification data for training, a machine learning model for determining the class based on the acoustic features, wherein the class includes important, not important, urgent, not urgent, and a level of priority. The computer-executable instructions further cause the system to: generate, based on the generated plurality of audio sub-streams, an embedding of audio data, wherein the embedding is associated with a multi-dimensional vector representation of the one or more acoustic features of the received audio sub-stream, and wherein the trained machine learning model for classifying tasks is based on a neural network. The trained machine learning model is based on a regression model for regressively classifying tasks based on acoustic features changing over time.

In still further aspects of the technology relates to a computer-readable recording medium. The computer-readable recording medium storing computer-executable instructions that when executed by a processor cause a computer system to: receive audio input, receive the task, wherein the task is associated with the received audio input, determine one or more acoustic features of the received audio input, determine, based on the one or more acoustic features, a class of a task, wherein the class of the task indicates with at least either importance or urgency, and update a position of the task in a to-do list according to the class of the task, wherein the to-do list includes a plurality of tasks sorted based at least on either importance or urgency of respective tasks of the plurality of tasks. The computer-executable instructions that when executed by the processor further cause the computer system to: terminate, based on the determined class of the task, an execution of an ongoing task without interactively confirming a command of the task. The computer-executable instructions that when executed by the processor further cause the computer system to: transmit, at a time according to the determined class of the task, the task and the determined class of the task to a calendar application server, causing the calendar application to insert the task as a new task item according to a level of importance and urgency as specified by the determined class of the task. The computer-executable instructions that when executed by the processor further cause the computer system to: initiate a telecommunication, according to a level of importance and urgency as specified by the determined class of the task, to a destination as specified by the task. The computer-executable instructions that when executed by the processor further cause the computer system to: transmit the task with the class of the task, causing a receiving application to interactively display the task with an emphasis according to the class of the task. The computer-executable instructions that when executed by the processor further cause the computer system to: perform, based on the class of the task, the task before another task.

Any of the one or more above aspects in combination with any other of the one or more aspect. Any of the one or more aspects as described herein.

What is claimed is:

1. A computer-implemented method of determining a class of a task based on acoustic features of audio data associated with the task, the method comprising:
   receiving audio input data, wherein the audio input data is associated with a task, wherein the audio input data includes a foreground audio and a background audio;
   receive the task, wherein the task is associated with the received audio input data;
   determining, by a processor, based on a first trained machine learning model that predicts an acoustic feature from audio signal data as input by embedding the audio signal data in a vector form, a plurality of acoustic features of the received audio input, wherein the plurality of acoustic features includes a first acoustic feature associated with the foreground audio and a second acoustic feature associated with the background audio;
   determining, by the processor, based on a combination including the first and second acoustic features as input to a second trained machine learning model, a class of the task, wherein the class of the task indicates with at least urgency, wherein the second trained machine learning model predicts at least either importance or urgency of the task as inferred at least from the background audio as output; and
   automatically update, by the processor, a position of the task in a to-do list according to the class of the task, wherein the to-do list comprises a plurality of tasks sorted based at least on importance or urgency of respective tasks of the plurality of tasks, and the class specifies a level of urgency for performing of task.

2. The computer-implemented method of claim 1, the method further comprising:
   generating, based on the received audio input, a plurality of audio sub-streams;
   determining one or more acoustic features corresponding to one or more of the generated plurality of audio sub-streams;
   determining, based on the plurality of audio sub-streams, an audio type;
   generating, based on the audio type, the task; and
   determining, based on the one or more acoustic features, a class of the task using a trained machine learning model for classifying tasks, wherein the class of the task is associated with importance and urgency of the task.

3. The computer-implemented method of claim 1, the method further comprising:
receiving a set of audio type data for training, wherein the set of audio type data includes correct audio types associated with a set of audio data; and
training, based on the received set of audio type data for training, a machine learning model for determining an audio type of the audio input data.

4. The computer-implemented method of claim 1, the method further comprising:
receiving a set of task classification data for training, wherein the set of task classification data for training includes at least one correct class of the task associated with a set of acoustic features, wherein the class of the task indicates one or more of importance, urgency, and priority, and wherein the set of acoustic features include at least a pitch, a rhythm, and intensity of the audio input data; and
training, based on the received set of task classification data for training, a machine learning model for determining the class based on the plurality of acoustic features, wherein the class includes one or more of: important, not important, urgent, not urgent, and a level of priority.

5. The computer-implemented method of claim 2, the method further comprising:
generating, based on the generated plurality of audio sub-streams, an embedding of the audio input data, wherein the embedding is associated with a multi-dimensional vector representation of the one or more acoustic features of the generated plurality of audio sub-streams, and wherein the trained machine learning model for classifying tasks uses a neural network, and wherein the trained machine learning model is based on a regression model for regressively classifying the task based on acoustic features of at least one of the plurality of audio sub-streams over time.

6. The computer-implemented method of claim 2, wherein the plurality of audio sub-streams includes a foreground sound and a background sound, and wherein the class of the task with higher values of the one or more acoustic features in the background sound indicates higher importance than another task with lower values of the one or more acoustic features in the background sound.

7. The computer-implemented method of claim 6, wherein the one or more acoustic features include one or more of:
a volume,
a pitch,
a tone, or
intensity,
wherein the received audio input includes voice data with a level of stress as an attribute of the voice data, and
wherein the level of stress is associated with the one or more acoustic features.

8. The computer-implemented method of claim 2, wherein the class of the task includes one or more of important, not important, urgent, or not urgent.

9. A system for determining a class of a task using acoustic features of audio data associated with the task, the system comprises:
a processor; and
a memory storing computer-executable instructions that when executed by the processor cause the system to execute operations comprising:
receiving audio input data, wherein the audio input data includes a foreground audio and a background audio;
receiving the task, wherein the task is associated with the received audio input data;
determining by the processor, based on a first trained machine learning model that predicts an acoustic feature from audio signal data as input by embedding the audio signal data in a vector form, a plurality of acoustic features of the received audio input, wherein the plurality of acoustic features includes a first acoustic feature associated with the foreground audio and a second acoustic feature associated with the background audio;
determining, by the processor, based on a combination including the first and second acoustic features as input to a second trained machine learning model, a class of a task, wherein the class of the task indicates with at least either importance or urgency, wherein the second trained machine learning model predicts at least urgency of the task as inferred at least from the background audio as output; and
automatically updating, by the processor, a position of the task in a to-do list according to the class of the task, wherein the to-do list comprises a plurality of tasks sorted based at least on importance or urgency of respective tasks of the plurality of tasks, and the class specifies a level of urgency for performing the task.

10. The system of claim 9, the computer-executable instructions further cause the system to:
generate, based on the received audio input, a plurality of audio sub-streams;
determine one or more acoustic features corresponding to one or more of the generated plurality of audio sub-streams;
determine, based on the plurality of audio sub-streams, an audio type of the received audio input;
generate, based on the audio type, the task; and
determine, based on the one or more acoustic features, a class of the task using a trained machine learning model for classifying tasks, wherein the class of the task is associated with importance and urgency of the task.

11. The system of claim 9, the computer-executable instructions further cause the system to:
receive a set of audio type data for training, wherein the set of audio type data includes correct audio types associated with a set of audio data; and
train, based on the received set of audio type data for training, a machine learning model for determining an audio type of the audio input data.

12. The system of claim 9, the computer-executable instructions further cause the system to:
receive a set of task classification data for training, wherein the set of task classification data for training includes at least one correct class of the task associated with a set of acoustic features, wherein the class indicate one or more of importance, urgency, and priority, and wherein the set of acoustic features include at least a pitch, a rhythm, and an intensity of audio data; and
train, based on the received set of task classification data for training, a machine learning model for determining the class based on the plurality of acoustic features, wherein the class includes important, not important, urgent, not urgent, and a level of priority.

13. The system of claim 10, the computer-executable instructions further cause the system to:
generate, based on the generated plurality of audio sub-streams, an embedding of audio data, wherein the embedding is associated with a multi-dimensional vector representation of the one or more acoustic features of the received audio sub-stream, and wherein the trained machine learning model for classifying tasks is based on a neural network.

14. The system of claim 10, wherein the trained machine learning model is based on a regression model for regressively classifying tasks based on acoustic features changing over time.

15. A computer-readable storage medium storing computer-executable instructions that when executed by a processor cause a computer system to:
receive audio input data, wherein the audio input data includes a foreground audio and a background audio;
receive the task, wherein the task is associated with the received audio input data;
determine, by the processor, based on a first trained machine learning model that predicts an acoustic feature from audio signal data as input by embedding the audio signal data in a vector form, a plurality of acoustic features of the received audio input, wherein the plurality of acoustic features includes a first acoustic feature associated with the foreground audio and a second acoustic feature associated with the background audio;
determine, by the processor, based on a combination including the first and second acoustic features as input to a second trained machine learning model, a class of a task, wherein the class of the task indicates with at least urgency, wherein the second trained machine learning model predicts at least either importance or urgency of the task as inferred at least from the background audio as output; and
automatically update, by the processor, a position of the task in a to-do list according to the class of the task, wherein the to-do list includes a plurality of tasks sorted based at least on either importance or urgency of respective tasks of the plurality of tasks, wherein the class specifies a level of urgency for performing the task.

16. The computer-readable storage medium of claim 15, the computer-executable instructions that when executed by the processor further cause the computer system to:
terminate, based on the determined class of the task, an execution of an ongoing task without interactively confirming a command of the task.

17. The computer-readable storage medium of claim 15, the computer-executable instructions that when executed by the processor further cause the computer system to:
transmit, at a time according to the determined class of the task, the task and the determined class of the task to a calendar application, causing the calendar application to insert the task as a new task item according to a level of importance and urgency as specified by the determined class of the task.

18. The computer-readable storage medium of claim 15, the computer-executable instructions that when executed by the processor further cause the computer system to:
initiate a telecommunication, according to a level of importance and urgency as specified by the determined class of the task, to a destination as specified by the task.

19. The computer-readable storage medium of claim 15, the computer-executable instructions that when executed by the processor further cause the computer system to:
transmit the task with the class of the task, causing a receiving application to interactively display the task with an emphasis according to the class of the task.

20. The computer-readable storage medium of claim 15, the computer-executable instructions that when executed by the processor further cause the computer system to:
perform, based on the class of the task, the task before another task.

* * * * *